US006507768B1

(12) United States Patent
Regimbal et al.

(10) Patent No.: US 6,507,768 B1
(45) Date of Patent: Jan. 14, 2003

(54) METHOD AND SYSTEM TO COMPENSATE FOR WEAR IN A SHEET HANDLING DEVICE

(75) Inventors: Laurent A. Regimbal, Eagle, ID (US); Hernan Gutierrez, Colonia Alcaraz Guadalajara Jalisco (MX)

(73) Assignee: Hewlett-Packard Co., Palo Alto, CA (US)

( * ) Notice: Subject to any disclaimer, the term of this patent is extended or adjusted under 35 U.S.C. 154(b) by 155 days.

(21) Appl. No.: 09/708,772

(22) Filed: Nov. 7, 2000

(51) Int. Cl.[7] .................. G06F 7/00

(52) U.S. Cl. .................. 700/213; 700/304

(58) Field of Search .................. 700/213, 304, 700/33; 271/270, 258.01, 265.01, 265.02, 176

(56) References Cited

U.S. PATENT DOCUMENTS

| | | | | | |
|---|---|---|---|---|---|
| 4,015,701 | A | * | 4/1977 | Templeton | 101/91 |
| 4,794,241 | A | * | 12/1988 | Carsner et al. | 235/436 |
| 4,974,828 | A | * | 12/1990 | Matsuo et al. | 271/176 |
| 5,050,859 | A | * | 9/1991 | Paxon | 271/202 |
| 5,062,622 | A | * | 11/1991 | Kataoka et al. | 271/267 |
| 5,071,113 | A | * | 12/1991 | Nakamura et al. | 198/736 |
| 5,080,666 | A | * | 1/1992 | Kulpa et al. | 271/2 |
| 5,105,363 | A | * | 4/1992 | Dragon et al. | 226/29 |
| 5,166,735 | A | * | 11/1992 | Malachowski | 271/202 |
| 5,274,242 | A | * | 12/1993 | Dragon et al. | 250/223 R |
| 5,484,141 | A | * | 1/1996 | Yamashita et al. | 271/227 |
| 5,520,383 | A | * | 5/1996 | Amagai et al. | 271/265.01 |
| 5,692,741 | A | * | 12/1997 | Nakamura et al. | 271/10.03 |
| 5,969,371 | A | | 10/1999 | Andersen et al. | 250/559.15 |
| 6,227,534 | B1 | * | 5/2001 | Schoedinger et al. | 271/110 |
| 6,354,583 | B1 | * | 3/2002 | Skadow et al. | 271/10.03 |
| 6,378,864 | B1 | * | 4/2002 | Iesaka | 271/202 |

* cited by examiner

*Primary Examiner*—Khoi H. Tran

(57) ABSTRACT

A method and system to regulate the sheet transport speed in a sheet handling device. Sheets are transported at a transport speed governed by an assigned signal. The actual transport speed of the sheets is determined and the assigned signal is adjusted to make the actual transport speed match a desired transport speed.

18 Claims, 4 Drawing Sheets

METHOD AND SYSTEM TO COMPENSATE FOR WEAR IN A SHEET HANDLING DEVICE

FIELD OF THE INVENTION

The invention relates generally to sheet handling devices and, more particularly, to detecting and compensating for wear in the sheet handling components of those devices.

BACKGROUND

Sheet handling devices such as printers, copiers, and sorters/stackers generally use one or more friction transport rollers to transport sheets through the device. These rollers are driven at a constant angular velocity using a stepper motor or, in some instances, a DC motor. The linear transport speed of sheets passing through the device then becomes a function of the diameter of the rollers. Unfortunately, extended use of the device causes the rollers to wear and decrease in size. Once the diameter of a transport roller becomes too small, the device ceases to function properly.

As a function of the number of sheets passing through a device, the diameter d of a transport roller can be represented by the following equation.

$$d(Ksh)=d_n*e^{-Kw*Ksh}$$

The constant $d_n$ represents the nominal or original diameter of the transport roller. The factor Kw is a constant that depends upon a number of factors such as the material of the transport roller, the friction between the roller and the sheets, and the speed at which the roller is driven. The symbol Ksh represents the number of sheets that have passed through the device. The linear transport speed Ts at which the transport roller can move a sheet can then be represented by the following equation.

$$Ts=\pi*d(Ksh)*Av$$

Av represents the angular velocity at which the transport roller is driven. Combining the above two equations reveals the following.

$$Ts=\pi*d_n*e^{-Ks*Ksh}*Av$$

Consequently, as long as the angular velocity Av remains constant, the transport speed Ts will decrease through use of the device.

Market demands require ever increasing life spans for electronic devices. Consequently, to increase the life span of sheet handling devices a method and system embodying that system are needed to compensate for transport roller wear increasing the life of sheet handling devices.

SUMMARY

Accordingly, the present invention is directed to a method and system to regulate the sheet transport speed in a sheet handling device. Sheets are transported at a transport speed governed by an assigned signal. The actual transport speed of the sheets is determined and the assigned signal is adjusted to make the actual transport speed match a desired transport speed.

DETAILED DESCRIPTION

The invented method and system are intended for use with or as an integrated part of any printer, copier, sorter, stapler, transport, or any other sheet handling device. The following description and the drawings illustrate only a few exemplary embodiments of the invention. Other embodiments, forms, and details may be made without departing from the spirit and scope of the invention, which is expressed in the claims that follow this description.

Figure 1:
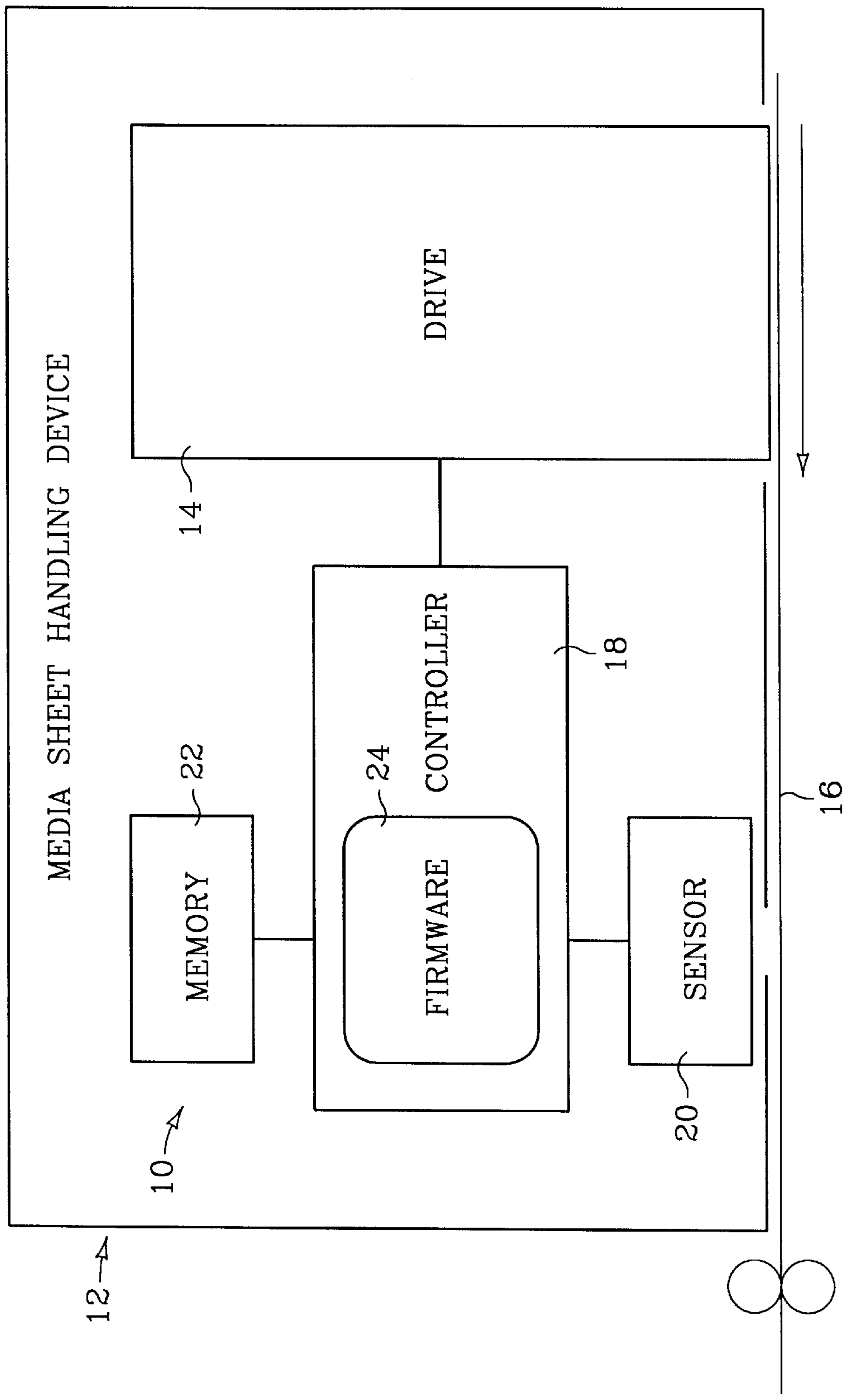
FIG. 1 is a schematic representation of a sheet transport speed regulating system according to one embodiment of the present invention.

FIG. 1 illustrates the basic components of a sheet transport regulating system, generally referenced as 10, integrated into sheet handling device 12. Further details are provided below with reference to the embodiment illustrated in FIG. 2. System 10 includes a drive 14 operative to transport a sheet 16 within handling device 12. Controller 18 sends an assigned signal to drive 14. The assigned signal, generally determined and set initially when sheet handling device 12 is manufactured, causes drive 14 to operate at a predetermined level and transport sheet 16 at a desired transport speed through sheet handling device 12. For example, when drive 14 includes a DC motor and a set of rollers driven by the motor, the assigned signal will be an electrical current having an electrical potential needed to drive the rollers at a predetermined angular velocity that corresponds to the desired transport speed. Through use and wear of drive 14, the assigned signal will eventually produce an actual transport speed that deviates from the desired transport speed. To compensate for this deviation, controller 18 using sensor 20 detects the actual transport speed and adjusts the assigned signal until the actual transport speed matches the desired transport speed.

It is envisioned that system 10 will also include memory 22 electronically coupled to controller 18. A value representing the assigned signal and a value representing the desired transport speed are stored electronically in memory 22. Each time sheet handling device 12 is powered on, controller 18 reads the values stored in memory 22. When controller 18 adjusts the assigned signal to compensate for differences between the actual transport speed and the desired transport speed, controller 18 saves, in memory 22, a value representing the adjusted signal as the value representing the assigned signal. Preferably, memory 22 is non-volatile memory so that, in case of an abrupt power loss, memory 22 always contains the value representing the assigned signal necessary for drive 14 to produce a transport speed equal to the desired transport speed. It is also envisioned that controller 18 will include firmware 24 having machine readable instructions for performing these tasks required of controller 18. Other configurations are possible. For example, the pertinent functions of controller 18 might be implemented through software running on a host computer or in a microprocessor in device 12 using memory in the host computer or in the device. Hence, the above configuration is not intended to limit the invention to any specific embodiment or implementation.

Figure 2:
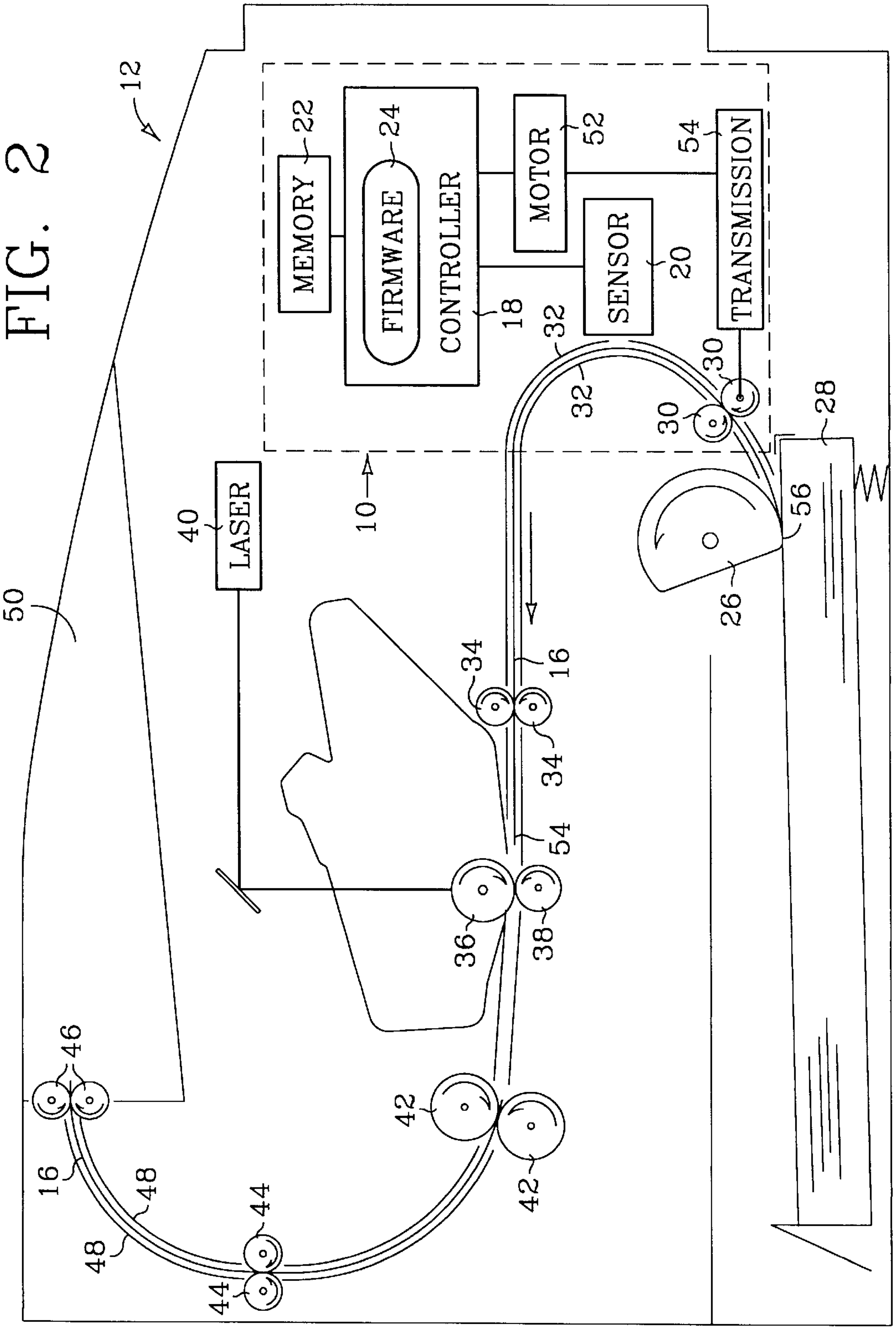
FIG. 2 is an exemplary side view of a laser printer that incorporates one embodiment of the present invention.

In FIG. 2 sheet handling device 12 is a printer incorporating sheet transport regulating system 10. Sheet handling device 12 could also be a facsimile machine, a copier, a sorter, or any other device through which sheets are transported. In operation, pick roller 26 retrieves the top sheet 16 from the stack in paper tray 28 and advances it to transport rollers 30. As transport rollers 30 further advance sheet 16, guide 32 directs sheet 16 towards transport rollers 34. Transport rollers 34 advance sheet 16 to drum 36 and transfer roller 38 where toner is applied to sheet 16 in the form of a desired image previously placed on drum 36 using laser 40. Sheet 16 then moves through heated fuser rollers 42 where the applied toner is fixed. As transport rollers 44 and 46 advance sheet 16, guide 48 directs sheet 16 into output bin 50.

In the version shown in FIG. 2, drive 14 is made up of transport rollers 30 being driven by motor 52 through transmission 54. It is envisioned that motor 52 will be a stepper motor and the assigned signal will be a series of electrical pulses produced at a frequency needed to drive transport roller 30 at a given angular velocity. In instances where motor 52 is a DC motor, the assigned signal will be an electrical current having an electrical potential needed to drive transport rollers 30 a given angular velocity. As use causes the diameter of transport rollers 30 to decrease or the components of transmission 54 to wear, controller 18, depending upon the type of motor 52 used, adjusts the frequency or electrical potential of the assigned signal to compensate for the difference, if any, between the actual transport speed and the desired transport speed.

It is envisioned that firmware 24 will use a proportional algorithm to adjust the assigned signal. For example, if the desired transport speed is 20 mm/s and the actual transport speed is 16 mm/s, the actual transport rate would need to be increased by 25%. Generally, the angular velocity of transport roller 30 is directly proportional to the signal controller 18 sends to motor whether that signal varies by frequency or an electrical potential. Proportionally adjusting the assigned signal increasing by 25% the frequency of the electrical pulses sent to a stepper motor or increasing by 25% the electrical potential sent to a DC motor should increase the actual transport speed to 20 mm/s.

Still referring to FIG. 2, it is also envisioned that firmware 24 will include instructions for determining the actual transport speed of sheet 16 using sensor 20 located near transport rollers 30 along the path traveled by sheet 16. Sensor 20 may be an optical or mechanical sensor that generates data representing the elapsed time between when leading edge 54 and trailing edge 56 of sheet 16 each pass a given point. Using that data and the physical dimensions of sheet 16, firmware 24 determines the individual transport speed of sheet 16. U.S. Pat. No. 5,969,371, issued to Eric L. Anderson, Darrell L. Cox, and Rhasool Shabazz in 1999 and incorporated herein by reference, discloses a sensor capable of sensing the edge of a sheet. The methods and techniques disclosed in the '371 patent can be used here to allow sensor 20 to inform controller 18 of the elapsed time between when the edges 26 and 28 pass a given point along the path traveled by sheet 16.

Typically, sheet handling device 12 handles different types of sheets 16 including letter and legal sized paper, envelopes, transparencies, and many others. Each sheet type can have unique physical dimensions creating a challenge for determining the actual transport speed when varying sheet types pass through sheet handling device 12. If sheet handling device 12 uses unique input bins for each type of sheet 16, controller 18 can determine the type of each individual sheet by identifying the sheet's input bin. Memory 22, then, contains a table of values relating each sheet type to its physical dimensions. Controller 18, knowing the type of sheet, acquires the physical dimensions of the sheet from memory 22 and determines the individual transport speed using those dimensions and the information provided by sensor 20.

Uncontrollable variables such as bends and curls in individual sheets 16 can cause the determined transport speed for each sheet 16 to vary. Experiments have revealed as much as a three percent variance in the determined transport speeds of three successive sheets. This variance increases or decreases depending upon the weight of the sheets used. Consequently, controller 18 preferably determines the actual transport speed by averaging the individual transport speeds of a number of sheets.

Averaging can be accomplished using the following algorithm.

$$Ats(sh) = \frac{1}{m} * [Its(sh-1) + Its(sh-2) + Its(sh-3) + \ldots + Its(sh-m)]$$

Where Ats represents the actual transport speed, Its represents the individual transport speeds for each sheet 16, m represents the number of averaging elements, and sh represents the sheet 16 currently being transported. Controller 18, then, could retain or store in memory 22 the individual transport speeds for the number of sheets needed to determine the actual transport speed. For example, the actual transport speed may be an average of the individual transport speeds of the most recent fifty sheets 16 transported through device 12. In this case, the number of averaging elements m would be fifty. Controller 18 would then sum the individual transport speeds of those fifty sheets and divide that sum by fifty.

For many sheet handling devices, motor 52 properly functions only within a given operating range. In some cases, device 12 will malfunction if motor 52 runs outside that operating range. In other cases, motor 52 cannot physically function outside the operating range. Memory 22, therefore, contains values representing the operating range for motor 52. Firmware 24 will only allow controller 18 to adjust the assigned signal if the adjustment causes motor 52 to function within the operating range. If a stepper motor is used, the operating range for the motor could be a range of frequencies. If a DC motor is used, the operating range could be a range of electrical potentials. If fully compensating for differences between the actual and desired transport speeds requires an adjustment to the assigned signal that would cause motor 52 to function near or outside the operating range, controller 18 can then issue an alert indicating the problem and that worn or damaged components, such as transport roller 30 or transmission 54, need to be replaced.

Although not shown in FIG. 2, the angular velocity of transport rollers 34, 44, and 46 could also be regulated by controller 18. In this case additional sensors 20 coupled to controller 18 would each be placed near transport rollers 34, 44, and 46 along the path traveled by sheet 16. Using additional motors, controller 18 could individually govern the angular velocity of all transport rollers 30, 34, 44, and 46 maintaining a uniform transport speed throughout sheet handling device 12. Moreover, drive 14 need not utilize transfer rollers. Instead drive 14 could include a sheet conveying belt circulating around two or more tensioning rollers. Drive 14 could also include a sheet conveying tray moving between two or more selected positions.

Figure 3:
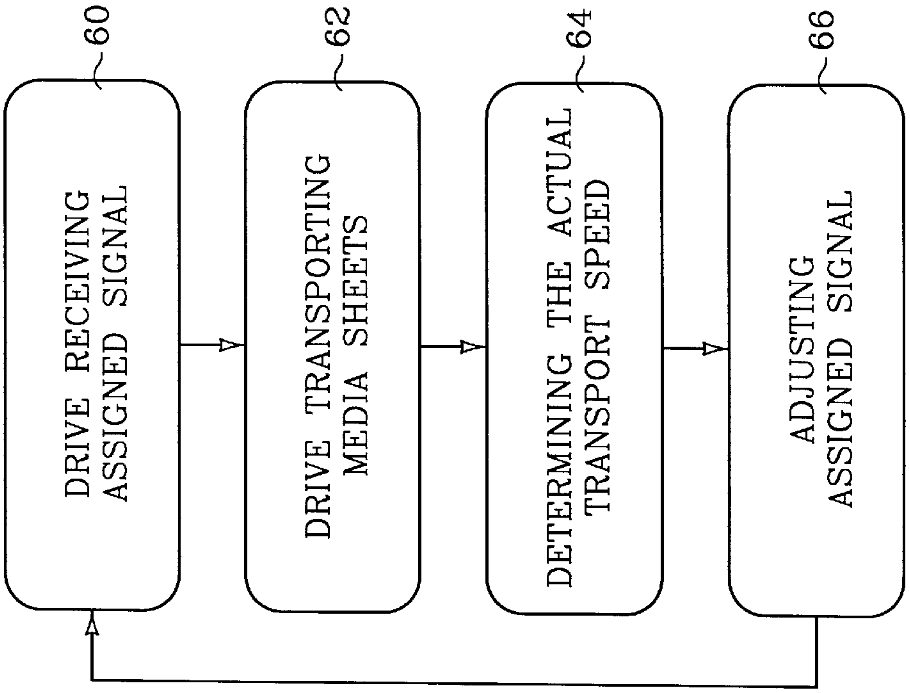
FIG. 3 is a flow diagram according to one embodiment of the invented method using a drive to transport sheets.

One method according to the present invention for regulating the transport speed of sheet handling system 12 will now be described with reference to FIGS. 1 and 3. Drive 14 receives an assigned signal to transport sheets through device 12 (step 60). Drive 14 then transports sheets through device 12 at a transport speed governed by the assigned signal (step 62). Controller 18 using sensor 20 determines the actual transport speed of sheets 16 (step 64). Controller 18, then, adjusts the assigned signal, if needed, to make the actual transport speed match the desired transport speed for device 12 (step 66).

Figure 4:
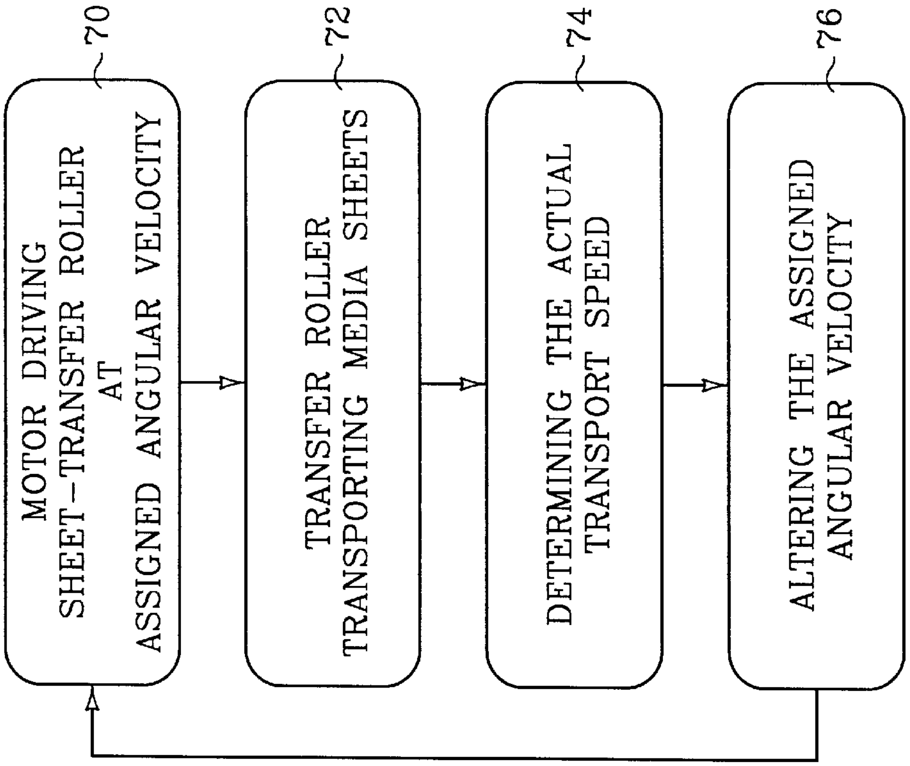
FIG. 4 is a flow diagram according to a second embodiment of the invented method where sheets are transported by a transport roller.

One method of regulating the transport speed using transport roller 30 will now be described with reference to FIGS. 2 and 4. Motor 52 drives transport roller 30 at an assigned angular velocity (step 70). Transport roller 30 transports sheets 16 through device 12 at a transport speed governed by the assigned angular velocity and the diameter of transport roller 30 (step 72). Controller 18 using sensor 20 determines the actual transport speed of sheets 16 (step 74). Controller 18, then, adjusts the assigned angular velocity, if necessary, to make the actual transport speed match the desired transport speed for device 12 (step 76). As sheets are being transported through device 12, the process repeats with step 74 allowing to angular velocity to be continually monitored and adjusted as needed.

Figure 5:
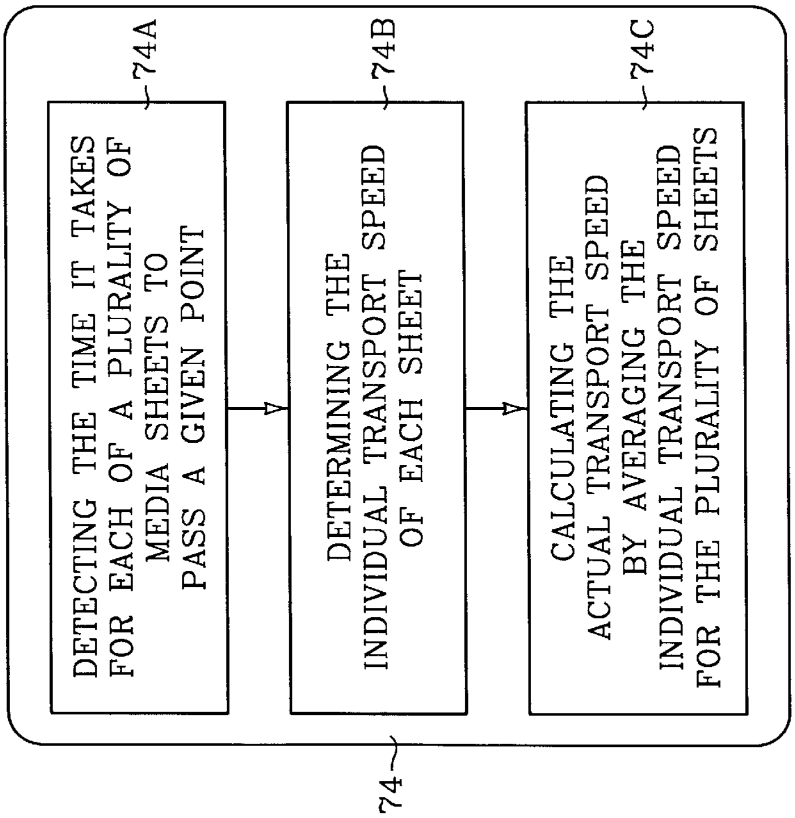
FIG. 5 is a flow diagram illustrating the details of one version of the determining step of FIG. 4.
Figure 6:
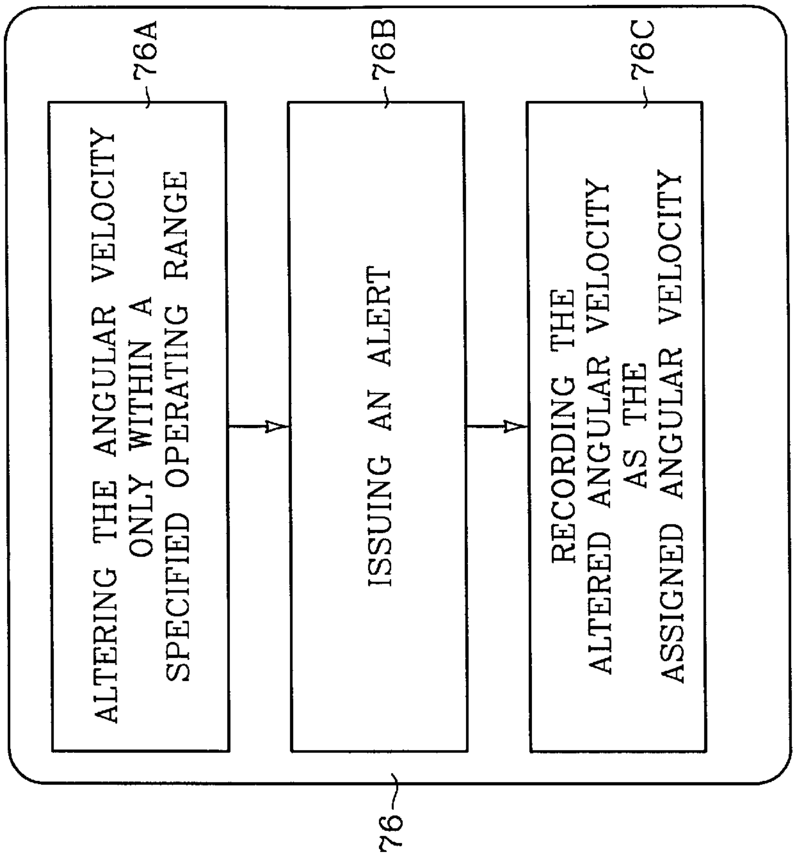
FIG. 6 is a flow diagram illustrating the details one version of the adjusting step of FIG. 4.

One preferred version of the details of the determining and adjusting steps of FIG. 4 will be described with reference to FIGS. 5 and 6. To sense the actual transport speed, controller 18 using sensor 20 detects the time it takes for each of a plurality of sheets 16 to pass a given point (step 74A). Using firmware 24, controller 18 determines the individual transport speed of each of those sheets (step 74B) and determines the actual transport speed by averaging a selected number of recent individual transport speeds (step 74C). To adjust the angular velocity of transport roller 30, controller 18 retrieves an operating range from memory 22 and only adjusts the assigned angular velocity only if the adjustment causes the motor to function within that operating range (step 76A). If the angular velocity needed to compensate for the difference between the actual transport speed and the desired transport speed would cause the motor to function near or outside the operating range, controller 18 issues an alert indicating the problem (step 76B). Controller 18 then saves the adjusted angular velocity as the assigned angular velocity in memory 22 (step 76C).

What is claimed is:

1. A method to regulate the sheet transport speed in a sheet handling device, comprising:

transporting sheets at a transport speed governed by an assigned signal;

determining an actual transport speed of the sheets;

adjusting the assigned signal to make the actual transport speed match a desired transport speed; and saving the adjusted signal as the assigned signal.

2. The method of claim 1, further comprising sending to a drive an assigned signal to transport sheets and wherein the act of transporting comprises the drive transporting sheets at a transport speed governed by the assigned signal.

3. The method of claim 1, wherein transporting comprises a motor driving a sheet transport roller at an assigned angular velocity governed by the assigned signal and the transport roller transporting sheets.

4. The method of claim 3, wherein the act of determining the actual transport speed comprises averaging the transport speeds of each of a plurality of sheets.

5. The method of claim 3, further comprising issuing an alert if adjusting the assigned signal will cause the motor to operate outside a specified operating range.

6. The method of claim 3, wherein adjusting comprises adjusting the assigned signal to make the actual transport speed match a desired transport speed comprises adjusting only if the adjustment allows the motor to operate within a specified operating range.

7. The method of claim 1, wherein:

transporting comprises reading a value representing an assigned signal and using the value to transport sheets at a transport speed governed by an assigned signal;

adjusting comprises adjusting the value representing the assigned signal to make the actual transport speed match a desired transport speed; and saving the adjusted value as the value associated with the assigned signal.

8. A method to regulate the sheet transport speed in a sheet handling device, comprising:

transporting sheets at a transport speed governed by an assigned signal;

determining an actual transport speed of the sheets by averaging the transport speeds of each of a plurality of sheets; and adjusting the assigned signal to make the actual transport speed match a desired transport speed.

9. A sheet transport speed regulating system for use in a sheet handling device, the system comprising:

a drive operative to transport sheets through the device;

a sensor operative to generate data for determining the transport speed of sheets being transported by the drive; and a controller in operative communication with the sensor and the drive, the controller operative to transmit an assigned signal to the drive causing the drive to transport the sheets at a transport speed corresponding to the assigned signal, to determine the actual transport speed from the data generated by the sensor, to adjust the assigned signal to make the actual transport speed match the desired transport speed, and to save the adjusted signal as the assigned signal.

10. The system of claim 9, wherein the drive comprises:

a transport roller operative to transport sheets;

a motor drivingly coupled to the transport roller; and wherein the assigned signal sent by the controller comprises a signal for the motor to drive the transport roller at an angular velocity corresponding to the assigned signal.

11. The system of claim 9, wherein the controller comprises firmware with machine readable instructions for determining the actual transport speed using the data generated by the sensor and for adjusting the assigned signal to make the actual transport speed match the desired transport speed.

12. The system of claim 11, further comprising a memory having stored therein a value representing the assigned signal to be transmitted to the drive, and the firmware further comprises instructions for retrieving the stored value from the memory.

13. The system of claim 12, wherein the firmware further comprises instructions for saving a value representing the adjusted signal as the assigned signal in the memory.

14. The system of claim 12, wherein the memory having further stored therein values representing an operating range for the drive, and the firmware further comprises instructions for issuing an alert if the adjusted signal will cause the drive to function outside the operating range stored in the memory.

15. The system of claim 14, wherein the firmware's instructions for adjusting comprise instructions for adjusting the assigned signal only if the adjustment allows the drive to function within the operating range.

16. The system of claim 12, wherein:

the memory having further stored therein a table of values for referencing the relation between a type of sheet and that sheet's physical dimensions;

the data generated by the sensor is data representing the time it takes each sheet to pass a given point; and the firmware's instructions for determining the actual transport speed comprise instructions for determining the type of sheets being transported by the transport roller and determining the individual transport speed of each sheet using the physical dimensions of that sheet and the data generated by the sensor for that sheet.

17. The system of claim 16, wherein the instructions for determining the actual transport speed comprise further instructions for averaging the individual transport speeds of a plurality of sheets.

18. The system of claim 9, wherein the drive comprises a transport roller operative to transport sheets, and a motor drivingly coupled to the transport roller, the motor operative to drive the transport roller at an angular velocity governed by the assigned signal.

* * * * *